United States Patent [19]

Schultz

[11] Patent Number: 5,471,646
[45] Date of Patent: Nov. 28, 1995

[54] METHOD FOR ESTABLISHING A USER DEFINED RADIO TALK GROUP IN A TRUNKED RADIO COMMUNICATION SYSTEM

[75] Inventor: Charles P. Schultz, Hialeah, Fla.

[73] Assignee: Motorola, Inc., Schaumburg, Ill.

[21] Appl. No.: 283,327

[22] Filed: Aug. 1, 1994

[51] Int. Cl.⁶ .................................................. H04Q 7/28
[52] U.S. Cl. ......................... 455/54.1; 455/34.2; 455/68
[58] Field of Search ............................ 455/34.1, 34.2, 455/54.1, 54.2, 56.1, 38.1, 68

[56] References Cited

U.S. PATENT DOCUMENTS

| | | | |
|---|---|---|---|
| 4,723,264 | 2/1988 | Sasuta et al. ........................ 455/54.2 X |
| 5,014,345 | 5/1991 | Comroe et al. ......................... 455/54.2 |
| 5,371,900 | 12/1994 | Bar-On et al. ..................... 455/54.1 X |

*Primary Examiner*—Chi H. Pham
*Attorney, Agent, or Firm*—Pedro P. Hernandez; Barbara R. Doutre

[57] ABSTRACT

A method is provided for a group of radios to establish a talk group in order for the radios to communicate with each other. The method allows for a group of radios (200) to select a talk group which users can communicate with one another, independent of how the radios in the trunked system (600) are grouped at the system-level.

9 Claims, 3 Drawing Sheets

VIRTUAL TALKGROUP CALL

VIRTUAL TALKGROUP GRANT

AFFILIATED VIRTUAL GROUP CALL

VIRTUAL GROUP CALL UPDATE

METHOD FOR ESTABLISHING A USER DEFINED RADIO TALK GROUP IN A TRUNKED RADIO COMMUNICATION SYSTEM

TECHNICAL FIELD

This invention relates in general to radio communication systems and more specifically to a method for allowing a radio user to establish a radio talk group.

BACKGROUND

In FIG. 6 a block diagram of a typical trunked communication system is shown. The radios or subscriber units 200 which are part of system 600 communicate over control channel 602 with the system central controller 604 in order to receive status and control information from the central controller 604. The system central controller 604 acts as the system coordinator and is responsible for assigning radios 200 to different repeaters 606 (channels) so that they may communicate amongst each other. The central controller 604 is also responsible for knowing where each of the radios are located (i.e. what voice channel) and for controlling other features typically found in a modern trunked communication system (e.g. handling phone patches, coordinating groups of radios in emergency situations, etc.). The typical central controller 604 includes a main processing unit such as a computer with appropriate control software which controls the operation of controller 604. Also normally included as part of controller 604 is a video display and keyboard in order to allow the central control operator to communicate with the system. The signals which are sent from the central controller 604 to the subscriber units 200 over the control channel 602 are typically called outbound signaling words ("OSW's"). The control signals going from radios 200 to the central controller 604 are called inbound signaling words (ISW's). OSW's inform radios 200 when to change channels automatically so as to communicate with other members in the same radio talk group over an assigned voice channel 606 which has been assigned by the system central controller 604.

When requesting a channel 606 for a talk group call, the radio unit 200 sends in a single word group request (if affiliated) with its individual radio identification number. The central controller 604 generates a grant OSW for the talk group affiliated with the radio unit that transmitted the channel request by referencing a radio ID to talk group affiliation database residing in the central controller 604. If there is no talk group affiliation in the central controller database (e.g., due to corrupt data, etc.), the central 604 requests a dual word ISW from the radio unit which identifies the unit ID and the desired talk group. If the radio unit changes talk groups, or systems, it immediately begins to receive calls for the new talk group or system and preferably performs an auto affiliation sequence after being on the selected talk group for about 2 seconds.

If PTT is asserted before auto affiliation, the radio unit 200 sends in a dual word ISW identifying the unit's radio ID number and the new desired talk group affiliation. The central controller 604 will store the talk group information in the affiliation table and then if a voice channel 606 is available, it will generate a grant OSW for that talk group. The grant OSW is initially sent out as a dual word grant to identify the transmitting unit and the talk group number. The requesting radio 200 sees its individual and talk group IDs in the grant OSW and goes to the voice channel 606 as a transmitting radio. Any other subscriber units 200 which are currently operating in the same talk group also see the talk group ID in the grant OSW and move to the same voice channel 606 as receivers. After the dual OSW grant is sent out 4 times, subsequent assignment update OSWs are transmitted by the central controller 604 as single word OSWs with simply the talk group ID and the voice channel it is assigned to the particular talk group.

An example of a typical trunked conversation will begin by one radio 200 in group "A" pressing PTT which automatically sends an ISW over the control channel 602 to the central controller 604 requesting a voice channel 606 grant. Once the request comes in, central controller 604 decides which voice channel 606 to assign and transmits an OSW via control channel 402 back to the radios 200. The OSW will inform all radios 200 in group "A" to move to repeater No. 2 for example, at which point all the radios in group "A" will move to that repeater to begin their conversation. Some trunked radio communication systems do not use a central control channel, but embed the control information within the voice channels such as by sending the control information using low-speed data which does not affect the voice communication.

There is currently no way for more than two radio users in a trunked radio communication system to establish communications with one another and not be heard by all members of a radio talk group or announcement group in a trunked radio system. The presently available feature of "Group Regrouping" (also known as patching) is initiated by an operator at the fixed-end of the radio communication system in order to let all members of two or more separate radio talk groups to communicate with each other.

Another feature found in trunked radio systems called "Dynamic Regrouping" is a means by which an operator at the fixed-end can group two or more users together, typically in an emergency situation, and later cancels the regrouping when the radio users no longer need to communicate with each other (i.e., after the emergency situation has terminated). A current "Regroup Request" feature allows users to request Dynamic Regrouping, but the fixed-end operator is still required to perform the regrouping. Also, a special zone/channel position must be reserved for Dynamic Regrouping operation on each of the trunked systems the radio is able to operate in.

Finally, another feature found in present trunked communication systems is called Private Conversation™ which allows one radio to establish a private conversation with a second radio. This feature however does not allow for more than two radios to communicate with each other, so group conversations can not be accomplished. Also, the feature does not allow for affiliation.

A need exists for a method by which radio users can select a talk group on their own so that a group of radio users can communicate with each other for a certain period of time, without other users in the system participating in the conversation.

DETAILED DESCRIPTION OF THE PREFERRED EMBODIMENT

Figure 1:
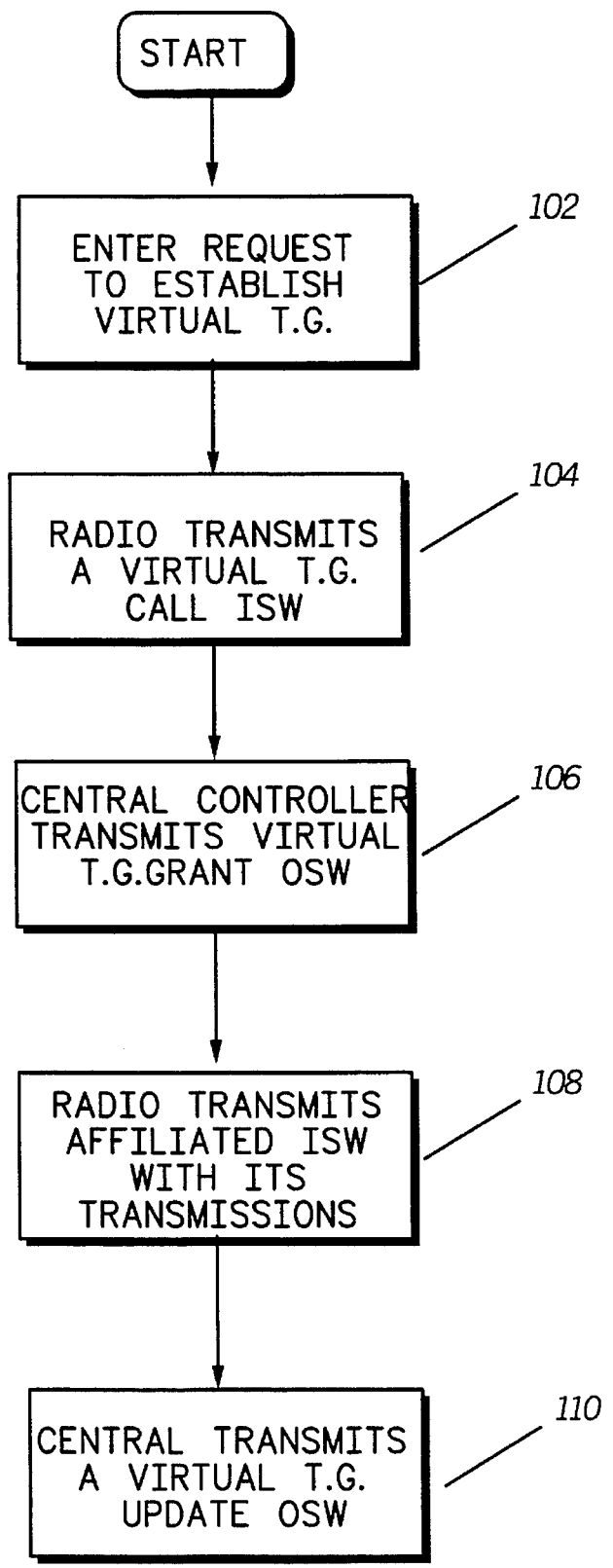
FIG. 1 is a simplified flowchart showing the steps of establishing a talk group by a radio user in accordance with the present invention.

Referring now to the drawings and specifically to FIG. 1, there is shown a flowchart showing the steps taken in order to establish a talk group conversation in accordance with the present invention. In order to distinguish the talk groups which are established by the radio users themselves as taught by the present invention and the conventional talk groups which are pre-established in the system, the talk groups established in accordance with the invention will be referred to as virtual talk groups. In step 102, radio users wanting to establish a virtual talk group in order to communicate with a select number of other radio users in the radio communication system each enter the same virtual talk group number at their individual radios. The virtual talk group number does not however have to be entered at the same time by all radio users. A radio user can join in on the virtual talk group conversation at a later time by entering the virtual talk group number when he is ready to enter the group.

The entering of the virtual talk group number can be accomplished by the radio users entering via a keypad on their radios a virtual talk group number. The virtual talk group number in the preferred embodiment is a number from 0000–4095. For example, each radio user wanting to be part of the virtual talk group enters the number "0100" in order to be placed in talk group "0100". Another way of entering a virtual talk group number is for the radios to be preprogrammed with a list of virtual talk groups the radio users can chose from. In this particular case, the radio users can each scroll through the virtual talk group list on their individual radios and pick a matching virtual talk group number which they can use to establish communications amongst each other. If a preprogrammed list of virtual talk groups is proved at the radios and a radio user decides to manually enter a virtual talk group number, the most recently entered virtual talk group number is preferably "remembered" and shown as one of the list members. If a list is used, one of the list members could be designated as a virtual announcement group ("VAG") this could be done by assigning virtual talk group number "0000" as an announcement group. The virtual announcement group call allows radios monitoring control channel traffic transmitted via the control channel 602 to listen to the virtual announcment group call even if they had not selected the announcment group at the radio. A virtual announcment group call allows matching radios in different virtual talk groups to monitor a call.

In step 104, once one of the radio users presses the push-to-talk (PTT) switch after choosing the virtual talk group number, the radio transmits a virtual talk group call ISW. This ISW informs the central controller 604 that the radio wants to communicate with other radios in the selected virtual talk group. A detailed discussion of all the ISWs and OSWs presented here will be discussed later on in the specification. In step 106, the central controller receives the virtual talk group call ISW. The central controller acknowledges the ISW by transmitting a virtual talk group grant OSW back to the radio. This OSW informs the radio that has transmitted the message which channel (repeater 606) to use in order to carry-out his conversation. Upon receiving this OSW the radio automatically moves to the assigned repeater frequencies to commence its transmission. In step 108, after the radio has received the virtual talk group grant OSW any further transmissions sent by the radio may include an affiliated call ISW. The database located in the system central controller 604 associates this radio's ID with the virtual talk group. The affiliated ISW saves channel overhead since the ISW no longer has to include the 12-bit virtual talk group number required in the ISW shown in FIG. 2. The system controller 604 responds to every affiliated virtual group call ISW with a virtual group call update OSW. In step 110, the central controller 604 informs the radios in the virtual talk group which channel number (repeater 606) to automatically move to in order to communicate with the other radios in the system which are part of the same virtual talk group.

In accordance with the invention, other radios can join in the virtual talk group conversation by performing the steps discussed above and specifying the same virtual talk group as the other radios in the virtual talk group. Typically, a virtual talk group in accordance with the invention is established by a few radio users in a traditional talk group or users in different talk groups who need to communicate temporarily. The few radio users then decide on a virtual talk group number to use, and the radio users begin implementing the steps required as discussed in the flowchart in FIG. 1 until all the radios are established in the same virtual talk group.

Figure 6:
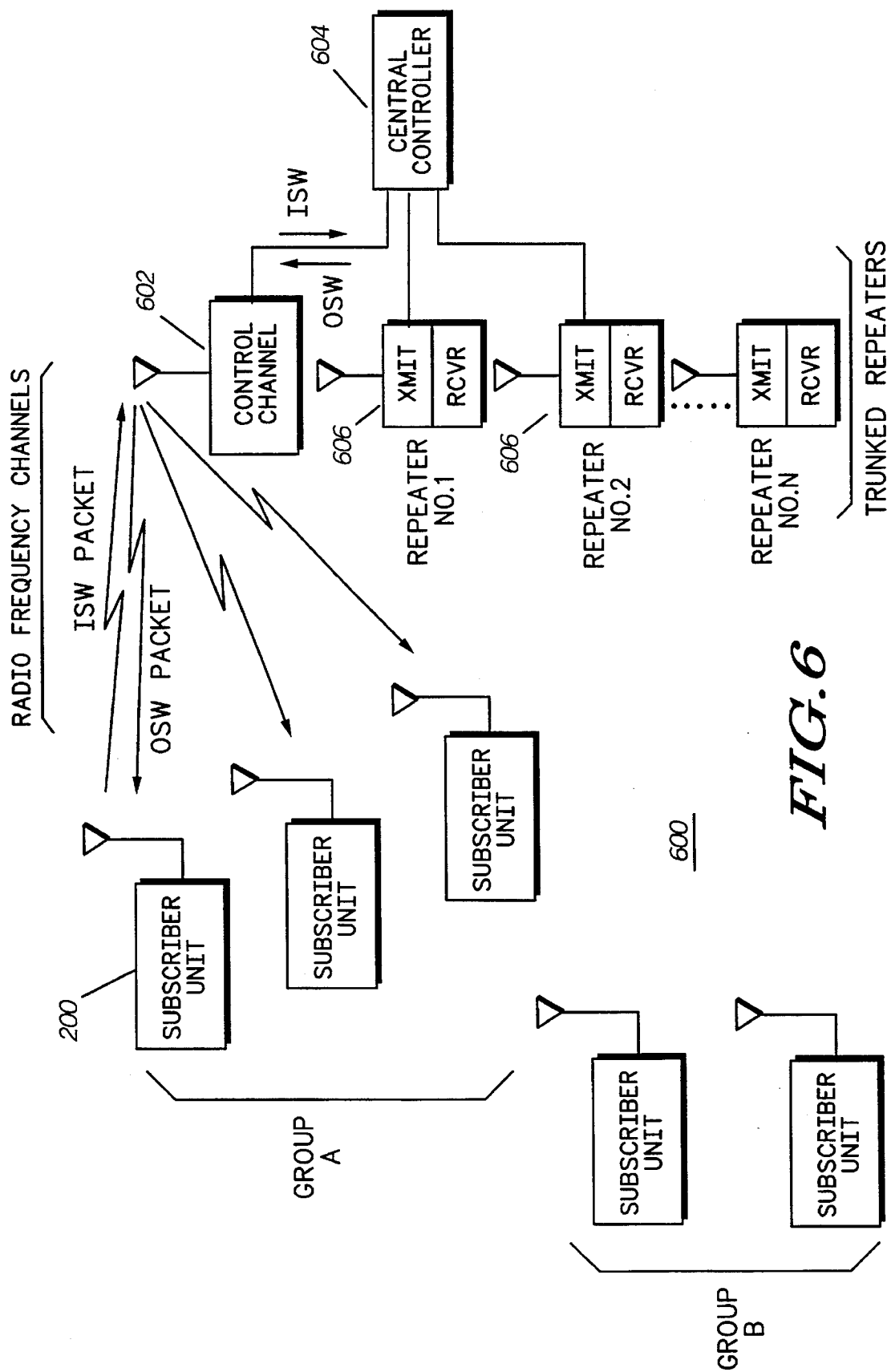
FIG. 6 shows a trunked radio system in accordance with the invention.

Using the present invention, a select number of users can place themselves in a talk group in which they themselves have chosen in order to discuss information which is of interest to only a select number of radio users in a system. In this way, the radio users in the virtual talk group do not have to disrupt other radio users which do not care or have need to be part of the virtual talk group, thereby improving radio communication efficiency. For example, a few of the radios in talk group "A" shown in FIG. 6 can decide they want to break-away from talk group "A" to discuss some information relevant only to the few radio users and decide among themselves to go to a specific virtual talk group.

Preferably, the virtual talk group is terminated by each radio user by changing the channel selector switch or doing any function on the radio which can amount to the termination of the virtual talk group at that particular radio.

Figure 2:
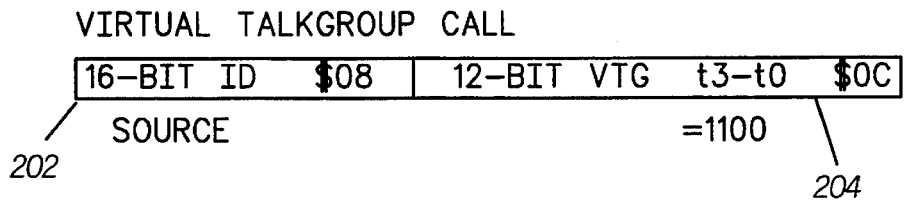
FIG. 2 shows an inbound signaling word (ISW) for a talk group call request in accordance with the present invention.

In FIG. 2, a virtual talk group call ISW transmitted by a radio wanting to get on the virtual talkgroup is shown. The ISW comprises a first word 202 having a 16-bit radio identification number which signifies the radio requesting the virtual talk group to the central controller. The op code for this word in the preferred embodiment is equal to $08. The second word 204 in the ISW comprises a 12-bit virtual talk group number which was entered in by the radio user. Preferably, the radio controller will convert the 4 digit talk group number to the 12-bit format which is transmitted. Also included as part of the second word 204 is a special code word such as a 4 bit t-word which is part of the trunking protocol. The t-bits are set equal to "1100" in order to inform the central controller 604 that the 12-bit talk group number is for a virtual talk group. The 4 t-bits are called signalling bits in convention trunked systems. In the preferred embodiment of this invention, the 4-bits are set to a unique code ("1100") which is not used in conventional trunked systems in order to signify during transmissions (ISWs and OSWs) that the talk group numbers are virtual talk groups. The op code for the second word is equal to $0C.

Figure 3:
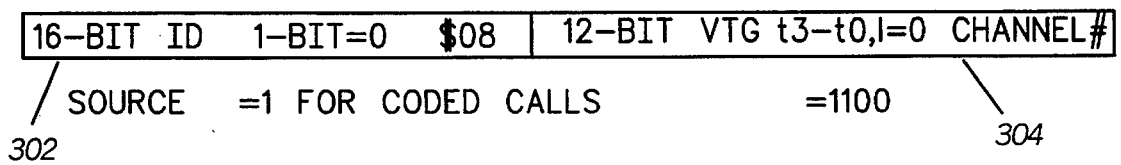
FIG. 3 shows a talk group grant outbound signaling word (OSW) in accordance with the invention.

In FIG. 3, a virtual talk group grant OSW sent by the central controller 604 is shown. The OSW comprises a first word 302 which includes a 16-bit radio identification number (same as the one found in 202), followed by a one bit type of call field. The one bit type of call will equal zero if the call is transmitted in a clear format (not encrypted) and is equal to one if the transmission has been coded. The grant OSW also includes a second word 304 comprising the 12-bit virtual talk group number and the four bit "t word". Finally, the second word 304 includes the channel number of the repeater 606 which the radio is to use in order to carry out the virtual talk group conversation.

Figure 4:
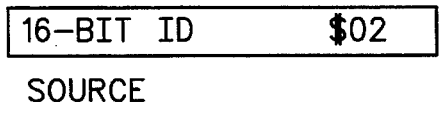
FIG. 4 shows an affiliated group call ISW in accordance with the invention.
Figure 5:
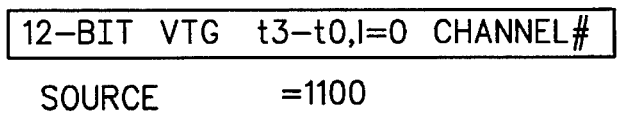
FIG. 5 shows a group call update OSW in accordance with the invention.

Referring now to FIG. 4, an affiliated virtual group call ISW is shown. This ISW is transmitted by each radio in the virtual talk group during the time the radio is conversing in the virtual talk group. The ISW includes the 16-bit radio identification number, identifying the radio making the transmission. The op code for this ISW is equal to $02. In FIG. 5, a virtual group call update OSW transmitted by the central controller 604 is shown. This OSW is transmitted by the central controller 604 in order to automatically direct radios on the system 600 that are set to the same virtual talkgroup number to the voice channel 606 being used by the virtual talk group. This OSW also includes the 4 bit "t-word" signifying that the 12-bit number is for a virtual talk group. The OSW also includes the current channel number that the radios must be set at in order to continue to partake in the virtual talk group conversation.

All radios using the same virtual talk group participate in all calls for that group by recognizing the unique t-bit pattern and matching the virtual talk group number. Virtual talk group calls that have the same virtual talk group number as talk groups already established in the trunked system are permitted, since the unique t-bit word combination sets the talk group apart from the regular talk groups available in the system.

As an added feature to the present invention, a virtual talk group grant OSW having a virtual talk group equal to "0000" could cause all radios operating in virtual talk groups to participate in the call, thereby the call acting as a virtual system-wide call. The central controller 604 will still use each radio's identification number to determine which services are available to those users. An additional system access field could be used to keep track of which radios are allowed to make virtual talk group calls. Virtual talk group numbers could also be added to scan lists residing in individual radio, so that particular radios can scan for virtual talk group activity as is done for conventional radio talk groups.

In summary, the present invention provides a way for radio users to communicate with each other in talk groups which are independent of how radios are grouped at the system-level, and without the need for a system operator to artificially group users as provided by current trunked radio features. The present invention also does not require that a special zone/channel position in the radio channel selector switch be set aside as required when performing a Dynamic Regrouping operation. Virtual talk group operation can be enabled per trunked system and can be used from any system which has virtual talk group capability enabled. The present invention provides for added flexibility for the users of trunked radio systems which is currently not available.

What is claimed is:

1. A method for establishing a user defined virtual talk group in a trunked radio communication system which has pre-established radio talk groups so that a plurality of radios from different pre-established radio talk groups can communicate with each other using the virtual talk group, comprising the steps of:

(a) entering a virtual talk group number at each of the plurality of radios so as to place each of the plurality of radios in the same virtual talk group; and (b) transmitting by one of the plurality of radios a data packet which includes the virtual talk group number and a special code to differentiate the virtual talk group number from the pre-established radio talk groups.

2. A method as defined in claim 1, wherein step (a) comprises the step of:

using controls located on each of the plurality of radios in order to enter the same virtual talk group number at each of the plurality of radios from different pre-established radio talk groups.

3. A method as defined in claim 1, wherein the special code transmitted during step (b) comprises a four bit code which distinguishes the virtual talk group number from the pre-established radio talk groups.

4. A method as defined in claim 1, comprising prior to step (a) the step of:

determining during a conversation taking place in one of the pre-established radio talk groups the virtual talk group number that is to be entered by the plurality of radios in step (a).

5. A method as defined in claim 1, wherein step (a) comprises:

entering via a keypad located on each of the plurality of radios from different pre-established radio talk groups the same virtual talk group number.

6. A method as defined in claim 1, wherein step (a) includes the steps of:

programming the plurality of radios to allow selection between a virtual talk group option and a pre-established radio talk group option;

programming a list of user selectable virtual talk groups into the plurality of radios by the users, each user selectable virtual talk group including the virtual talk group number;

selecting at the radio either the pre-established radio talk group option or the virtual talk group option;

controlling the selection of the pre-established radio talk groups with a physical switch once the pre-established radio talk group option is selected; and selecting the virtual talk group from the list of user selectable virtual talk groups when the virtual talk group option is selected.

7. A method for a group of radio users which operate in a trunked radio system including pre-established radio talk groups and a central controller to select a virtual talk group different from the pre-established radio talk groups, the method comprising the steps of:

(a) having each of the group of radio users select a virtual talk group number; and (b) transmitting a special code by at least one radio from among the group of radios signifying to the central controller that the at least one radio is operating in the selected virtual talk group.

8. A method as defined in claim 7, wherein all of the radios in the group of radios transmit the special code the first time they transmit a message after they have performed step (a).

9. A method as defined in claim 7, comprising the further step of:

(c) transmitting a message from the central controller to the at least one radio which includes the virtual talk group number, the special code and a channel number.

* * * * *